(12) United States Patent
Baier et al.

(10) Patent No.: US 10,046,925 B2
(45) Date of Patent: Aug. 14, 2018

(54) BLOWING DEVICE FOR A ROTARY AIRLOCK

(71) Applicant: Zeppelin Systems GmbH, Friedrichshafen (DE)

(72) Inventors: Hermann Baier, Eriskirch (DE); Ernst Gramm, Bad Waldsee (DE); Robert Müller, Daisendorf (DE); Thomas Hilebrand, Friedrichshafen (DE); Björn Feder, Meckenbeuren (DE)

(73) Assignee: ZEPPELIN SYSTEMS GMBH, Friedrichshafen (DE)

( * ) Notice: Subject to any disclaimer, the term of this patent is extended or adjusted under 35 U.S.C. 154(b) by 0 days.

(21) Appl. No.: 15/304,586

(22) PCT Filed: Apr. 15, 2015

(86) PCT No.: PCT/EP2015/000788
§ 371 (c)(1),
(2) Date: Oct. 17, 2016

(87) PCT Pub. No.: WO2015/158429
PCT Pub. Date: Oct. 22, 2015

(65) Prior Publication Data
US 2017/0036869 A1 Feb. 9, 2017

(30) Foreign Application Priority Data

Apr. 17, 2014 (DE) .......... 10 2014 005 655
May 21, 2014 (DE) .......... 10 2014 007 480

(51) Int. Cl.
*B65G 53/36* (2006.01)
*B65G 53/46* (2006.01)

(52) U.S. Cl.
CPC .............. *B65G 53/4641* (2013.01)

(58) Field of Classification Search
CPC ............ B65G 53/4641; B65G 53/4633
USPC .......... 406/128, 62, 63, 64, 65, 67, 130, 144
See application file for complete search history.

(56) References Cited

U.S. PATENT DOCUMENTS 1,503,365 A * 7/1924 Hoyt ............... B65G 53/30
                                                  406/50
3,610,476 A   10/1971 Starrett
4,058,986 A * 11/1977 Granholm ......... B65G 53/4641
                                                  222/368

(Continued)

FOREIGN PATENT DOCUMENTS

DE    707791 C      7/1941
DE    2065377 A1    5/1973
(Continued)

*Primary Examiner* — William R Harp
(74) *Attorney, Agent, or Firm* — Browdy and Neimark, PLLC

(57) ABSTRACT

Disclosed is a blowing device for a rotary air lock, comprising a flushing gas stream that is fed by a gas supply line (12) in order for adhering material to be flushed and blown out of at least one compartment (20-24) of the rotary air lock (20-24) when said compartment is located next to a product outlet of the rotary air lock. A blowing unit (30), which comprises at least one blowing tube (32) and is located in a feeding shoe (10) that is arranged at the product outlet, directs the flushing gas stream to at least one compartment (20-24) of the rotary air lock.

7 Claims, 9 Drawing Sheets

(56) References Cited

U.S. PATENT DOCUMENTS

| | | | | |
|---|---|---|---|---|
| 5,381,933 A | * | 1/1995 | Beirle | B65G 53/4633 222/345 |
| 5,480,268 A | * | 1/1996 | Smoot | B65G 53/4633 222/368 |
| 5,615,830 A | * | 4/1997 | Matsunaga | B05B 5/1683 222/368 |
| 7,112,120 B2 | * | 9/2006 | Rivir | B24C 1/003 222/170 |
| 2003/0199232 A1 | | 10/2003 | Rivir et al. | |
| 2005/0269369 A1 | | 12/2005 | Pfeiffer et al. | |
| 2016/0090019 A1 | * | 3/2016 | Roberge | B60P 1/60 414/507 |
| 2016/0202110 A1 | * | 7/2016 | Johnson | G01F 1/76 222/1 |

FOREIGN PATENT DOCUMENTS

| | | | |
|---|---|---|---|
| DE | 2363505 A1 * | 7/1975 | ......... B65G 53/4633 |
| DE | 3102153 A | 8/1982 | |
| DE | 202009017709 U1 | 9/2011 | |
| EP | 2341018 A1 | 7/2011 | |
| GB | 2129935 A | 5/1984 | |
| JP | 2000255778 A | 9/2000 | |
| JP | 2003341840 A | 12/2003 | |

\* cited by examiner

Fall 1: $\dot{V}_{Ges} = \dot{V}_{FG} + \dot{V}_{LG}$

Fall 2: (a) $\dot{V}_{LG1} + \dot{V}_{FG} = \dot{V}_{Ges1}$ (b) $\dot{V}_{Ges2} = \dot{V}_{LL2}$

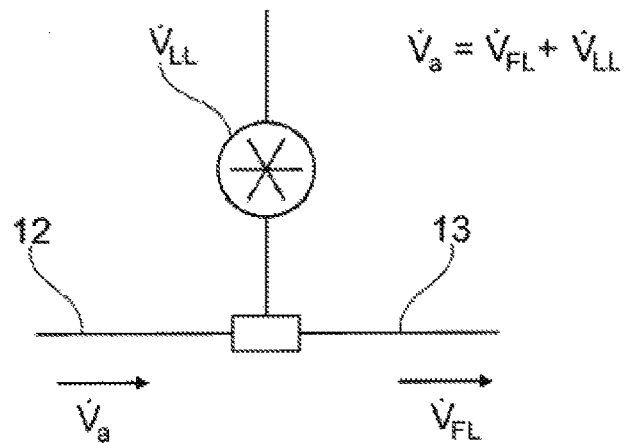
Fig. 9
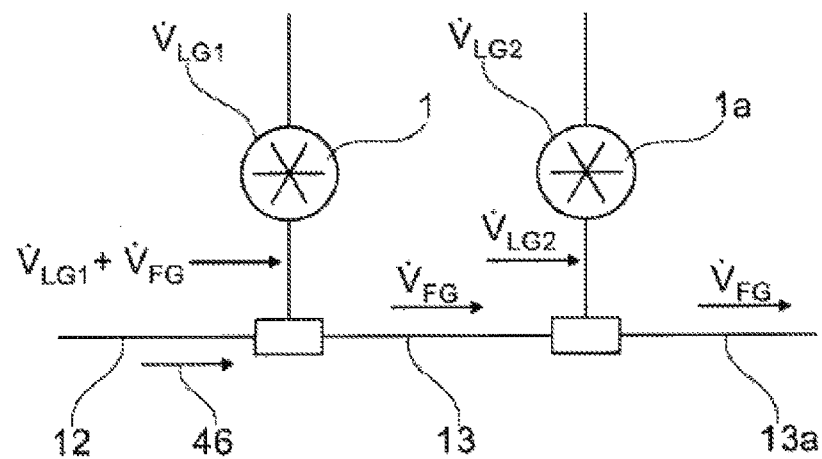
Fig. 10
$$\dot{V}_{Ges} = \dot{V}_{FL} + \dot{V}_{LL1} + \dot{V}_{LG2}$$
Fig. 11

BLOWING DEVICE FOR A ROTARY AIRLOCK

FIELD

The subject matter of the invention is a blowing device for a rotary airlock.

BACKGROUND

The invention proceeds in this case from prior art as described, for example, by U.S. Pat. No. 3,610,476 A1. In rotary airlocks, blowing out at least the product chamber closest to the outlet of the rotary airlock using a flushing gas stream is accordingly known, to ensure that material possibly adhering in this airlock chamber is also flushed into the outlet.

The cited document blows a flushing gas stream into the airlock chamber from the side of the housing of the airlock, in order to flush it out when the airlock chamber is located closest to the outlet.

The disadvantage of the known arrangement is that a large-volume flushing gas stream is required to enable sufficient flushing of the airlock chamber. This flushing gas stream has to be provided using separate means. The branching off of a flushing gas stream from the overall conveying gas stream is complex and difficult to implement.

The flushing gas suffers a high pressure loss upon entry into the airlock chamber, because the geometry of the airlock only permits small passage gas cross sections.

Accordingly, the respective airlock chamber can only be flushed using a small-volume flushing gas stream.

A further rotary airlock having blowing device is known from the subject matter of DE 31 02 153 A1, in which the compressed gas supply takes place in parallel to the axis of rotation. The main criterion in this case is the reduction of the pulsation during the product discharge via the reduction of the outlet diameter. It is also difficult here to inject a sufficiently high flushing gas volume and a sufficient flushing gas pressure into the airlock chamber, because the flushing gas can only be introduced from the end face of the housing of the rotary airlock. Sufficient flushing of the airlock chamber over the entire length of the airlock chamber is not possible in this arrangement. In the cited document, it is moreover the focal point that in principle a leaked gas stream is used for flushing. However, because the leaked gas is very small in volume, only a minor flushing effect of the airlock chamber also occurs. The blowing out effect of the airlock chamber is accordingly inadequate.

Similar prior art is disclosed in GB 2 129 935 A, in which the compressed air supply takes place in parallel to the axis of rotation, but the blowing out takes place tangentially in relation to the airlock chamber. The disadvantage also exists here that flushing can only be performed using a small flushing gas volume and low pressure.

US 2005/026 93 69 A1 relates to gas-permeable airlock chamber delimitations or airlock webs, which are to be permeated by a gas stream, wherein the gas stream is injected in parallel to the axis of rotation of the airlock. The flushing effect is inadequate, because the gas-permeable material has to be penetrated using specific gas-guiding boreholes, in the case of which, however, the risk exists that these boreholes will clog with the particulate material of the mass product stream. Therefore, a risk of clogging exists in such an airlock having gas-permeable airlock webs. Thus, only baked-on deposits in the region of the airlock webs are to be prevented; an actual blowing out effect is not ensured.

SUMMARY

The invention is therefore based on the object of refining a blowing device for a rotary airlock of the type mentioned at the outset in such a manner that the airlock chambers can be flushed over the entire axial length thereof with a substantially better efficiency.

To solve the stated problem, a blowing device is provided for a rotary airlock having a flushing gas stream, which originates from a gas supply, for flushing and blowing out adhering material from at least one airlock chamber when it is located closest to a product outlet of the rotary airlock, wherein the blowing device having at least one blowing tube orients the flushing gas stream (33) onto at least one airlock chamber, wherein a feeding shoe is arranged at the product outlet, in which the blowing device is arranged, and the gas supply of the blowing device is supplied by a conveying gas stream applied at the inlet to the blowing device.

The essential feature of the invention is that a feeding shoe is arranged at the outlet of the rotary airlock, in which a blowing device is arranged, which is oriented with at least one blowing tube directly on at least one airlock chamber in the essentially radial direction and generates a reversible flushing gas stream in the airlock chamber, wherein the gas supply of the blowing device is supplied from the conveying gas stream applied at the inlet side to the blowing device.

The essential feature of the invention is accordingly that a parallel flushing gas stream is no longer used, which only has a small volume and a low pressure, but rather the conveying gas stream itself, which is applied at the inlet side to the feeding shoe and is intended to convey the product, is supplied essentially exclusively to the blowing device, so that it enables blowing out of the airlock chambers with maximum pressure and maximum possible flushing gas volume.

In a certain manner, blowing out is not performed by a flushing gas stream guided in the bypass, but rather by a main gas stream, which is intended to convey the product, and this main gas stream is supplied essentially exclusively to this blowing device.

In one refinement of the present invention, however, it can be provided that conveying gas stream, which is supplied essentially exclusively to the blowing device according to the essential feature of the invention, so that a smaller quantity of gas of the conveying gas stream is conducted past the blowing device, but the blowing device is still essentially supplied with the largest part of the conveying gas quantity in the conveying line with gas of high volume and high pressure, to thus enable a maximum blowing effect in the airlock chambers on the outlet side of the rotary airlock.

This is thus an essential difference from the prior art, because in the prior art flushing is either performed in the parallel direction (axial direction of the airlock) from the covers of the airlock housing into the airlock chamber, which is linked to a low efficiency.

Furthermore, radial flushing devices oriented toward the airlock chambers were also known, which operated using a relatively low-volume flushing gas stream branched off from the conveying gas stream.

The core of the invention is accordingly that the feeding shoe essentially consists of a gas supply, which terminates the conveyance line in a gas-tight manner using a terminating plate or the like, and the blowing device opens into this terminating plate, the blowing orifice of which is oriented radially or essentially radially in the airlock chambers.

In the refinement of the present invention, it is provided that the blowing device consists not only of a single blowing tube, but rather multiple blowing tubes, which are arranged in parallel to one another and are distributed uniformly over the axial length of the airlock are provided, which accordingly enable a complete reverse flushing of the airlock chamber on the outlet side.

The invention is not restricted to a symmetrical arrangement of the blowing tubes. An asymmetrical arrangement of the blowing tubes in a feeding shoe is also a feature essential to the invention.

It is particularly advantageous in this case if the contour of the orifice of the blowing tubes which are oriented onto an airlock chamber on the outlet side is designed so that the blowing gas streams of the blowing tubes are oriented toward one another, to also enable a turbulent vortex flow in the airlock chamber distributed over the entire length of the airlock chamber. The flushing effect of the airlock chamber at the outlet side of the airlock is thus also substantially improved.

The contour of the orifice of the blowing tube can be formed in this case as round, oval, slotted, elliptical, or in any desired contour, it is only essential that the flushing gas stream enables if possible a uniformly blown-out airlock chamber over the entire length of the airlock chamber.

The injection points of the blowing device into the airlock chamber to be flushed out are arranged as divergently as possible, i.e., they are oriented away from one another, and the flushing gas streams generated by the two or by multiple blowing tubes are to unite again in the middle region of the airlock chamber and be oriented in the direction toward the feeding shoe, to enable an optimum flushing effect of the mass product stream adhering in the airlock chamber.

It is possible for the first time using the invention to substantially improve the discharge performance of a rotary airlock, because due to the flushing gas stream oriented approximately radially into the interior of the respective airlock chamber to be flushed out, the light mass product particles, which possibly remain in the flushing gas stream and sink downward due to gravity, no longer remain floating or even remain in the airlock chamber, but rather are reliably flushed out.

The invention is not restricted to a blowing device in a single rotary airlock. In one refinement of the invention, it can be provided that a number of rotary airlocks are arranged serially in succession and operate on a shared conveyed product line. Such a serial case occurs, for example, if a silo section having a number of silos arranged adjacent to one another is provided, and the outlets of these silos are all to discharge on a shared conveyor line. In this case, it is provided that each rotary airlock arranged therein is assigned a blowing device according to the invention in a feeding shoe, but a shutoff device is arranged downstream of the feeding shoe and upstream of the conveyor line, the shutoff element of which is adjustable in a manner driven by a motor.

There is then the case that discharge occurs from one silo, wherein only one rotary airlock having one blowing device is active, while all other rotary airlocks having their blowing devices are not in operation, because the shutoff element is closed in these rotary airlocks, while the shutoff device is open in the one rotary airlock in operation, which actuates the outlet of the silo.

In the other case, it can also be provided that multiple rotary airlocks are arranged adjacent to one another and are also opened adjacent to one another, so that multiple shutoff devices are thus opened by multiple rotary airlocks provided with a blowing device. In this manner, a discharge operation can be achieved in parallel from various adjacent silos which operate on a shared conveyor line.

In this last-mentioned case, the maximum possible conveying gas stream is also always introduced into the blowing device, without bypass flushing lines or the like being necessary.

The subject matter of the present invention results not only from the subject matter of the individual patent claims, but rather also from the combination of the individual patent claims with one another.

All specifications and features disclosed in the documents, including the abstract, in particular the spatial embodiment illustrated in the drawings, are claimed as essential to the invention, insofar as they are novel individually or in combination over the prior art.

BRIEF DESCRIPTION OF THE DRAWINGS

The invention will be explained in greater detail hereafter on the basis of drawings, which merely illustrate one embodiment. In this case, further features essential to the invention and advantages of the invention are disclosed in the drawings and the description thereof.

In the figures:

FIG. 9: shows the general summation formula for the gas guiding in the first case.

FIG. 10: shows a schematically drawn overview of rotary airlocks connected in series in succession having the illustration of the gas streams.

FIG. 11: shows the summation formula of the gas streams according to the series circuit according to FIG. 10.

DETAILED DESCRIPTION

Firstly, the disadvantages of the prior art will be explained on the basis of FIG. 12 according to the prior art, to be able to better explain the advantages of the invention based thereon.

Figure 12:
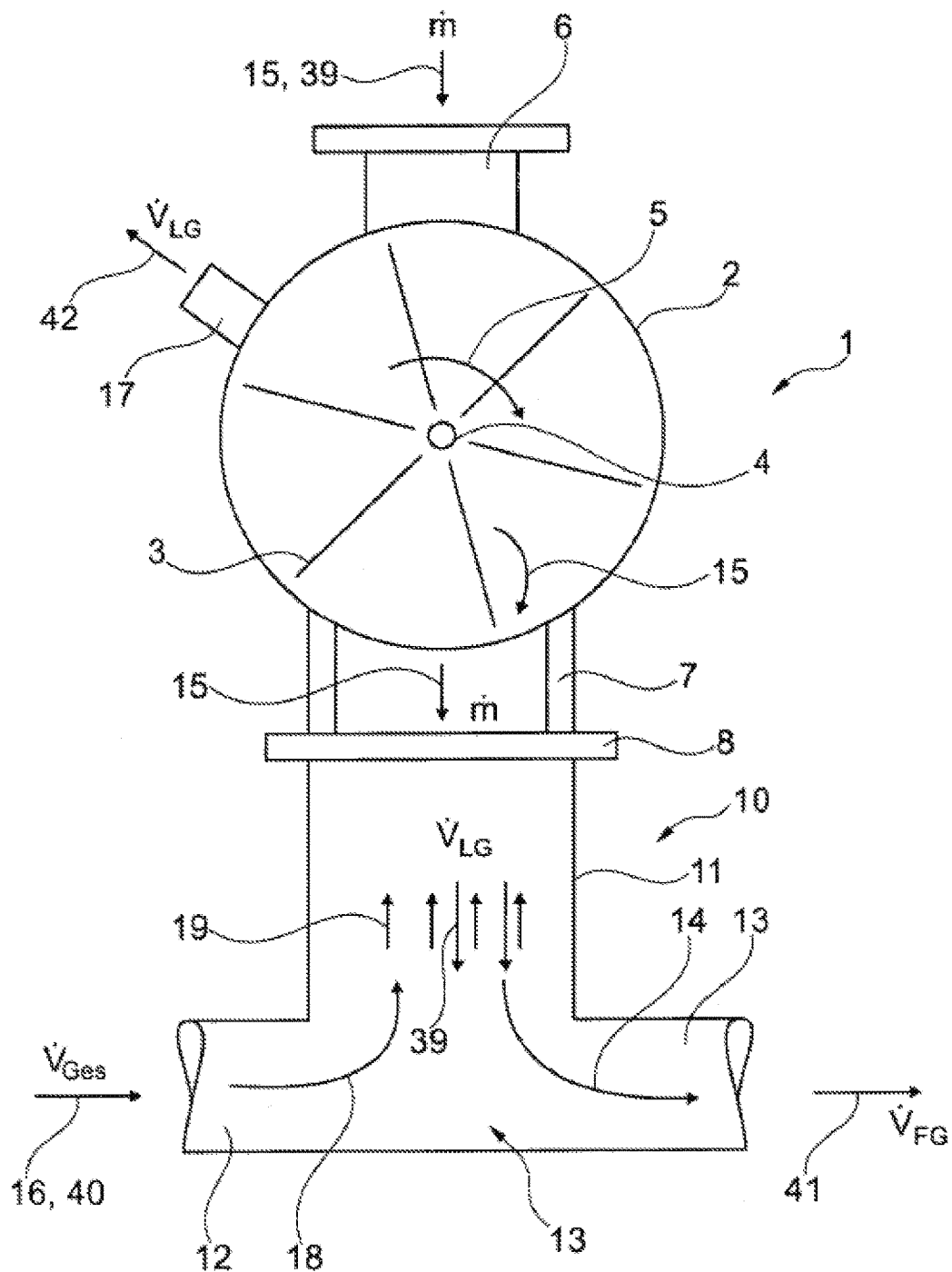
FIG. 12: shows an arrangement of a rotary airlock without blowing device according to the prior art.

The embodiment according to the prior art according to FIG. 12 essentially shows a rotary airlock 1, which is driven in a sealed manner in a housing 2 so it is rotatable in rotational direction 5, wherein the airlock 3 forms a number of airlock chambers, which are filled with a product in succession proceeding from a product supply 6.

Due to the rotation of the airlock 3 in the arrow direction 5, the product runs out downward in the arrow direction 15 via a product outlet 7, wherein the mass flow m runs out in the arrow direction 15, and reaches a feeding shoe 10, where the product is conveyed further as the product mass stream 39 in the arrow direction 14 in the conveyor line 13.

An introduction of the total quantity of gas 40 $V_{total}$ takes place via the gas supply 12 in the arrow direction 16.

A specific component of the total gas quantity 40 is accordingly deflected in the arrow direction 18 in the form of a leaked gas stream upward in the direction toward the rotating airlock 3 and leaves the leaked gas nozzle 17 as the leaked gas quantity 42 $V_{LG}$ at the leaked gas nozzle 17.

Accordingly, the leaked gas stream in the arrow direction 18 counters the product mass stream 39 flowing downward in the arrow direction 14, so that this downwardly flowing product mass stream 39 is disturbed and held up by the opposing leaked gas stream meeting it in the arrow direction 18. This even has the result that very light particles of a particulate bulk material are prevented from leaving in the conveyor line 13 in the arrow direction 14. The performance of the rotary airlock 1 according to the prior art is thus substantially impaired.

Complete emptying of the individual chambers of the airlock 3 is also not ensured, because accumulations are not removed and complete emptying of the airlock chamber is not ensured.

These advantages were already partially remedied according to the prior art according to the documents acknowledged in the introduction to the description, but only using low-volume flushing gas streams which are under low pressure. The invention begins here.

Figure 1:
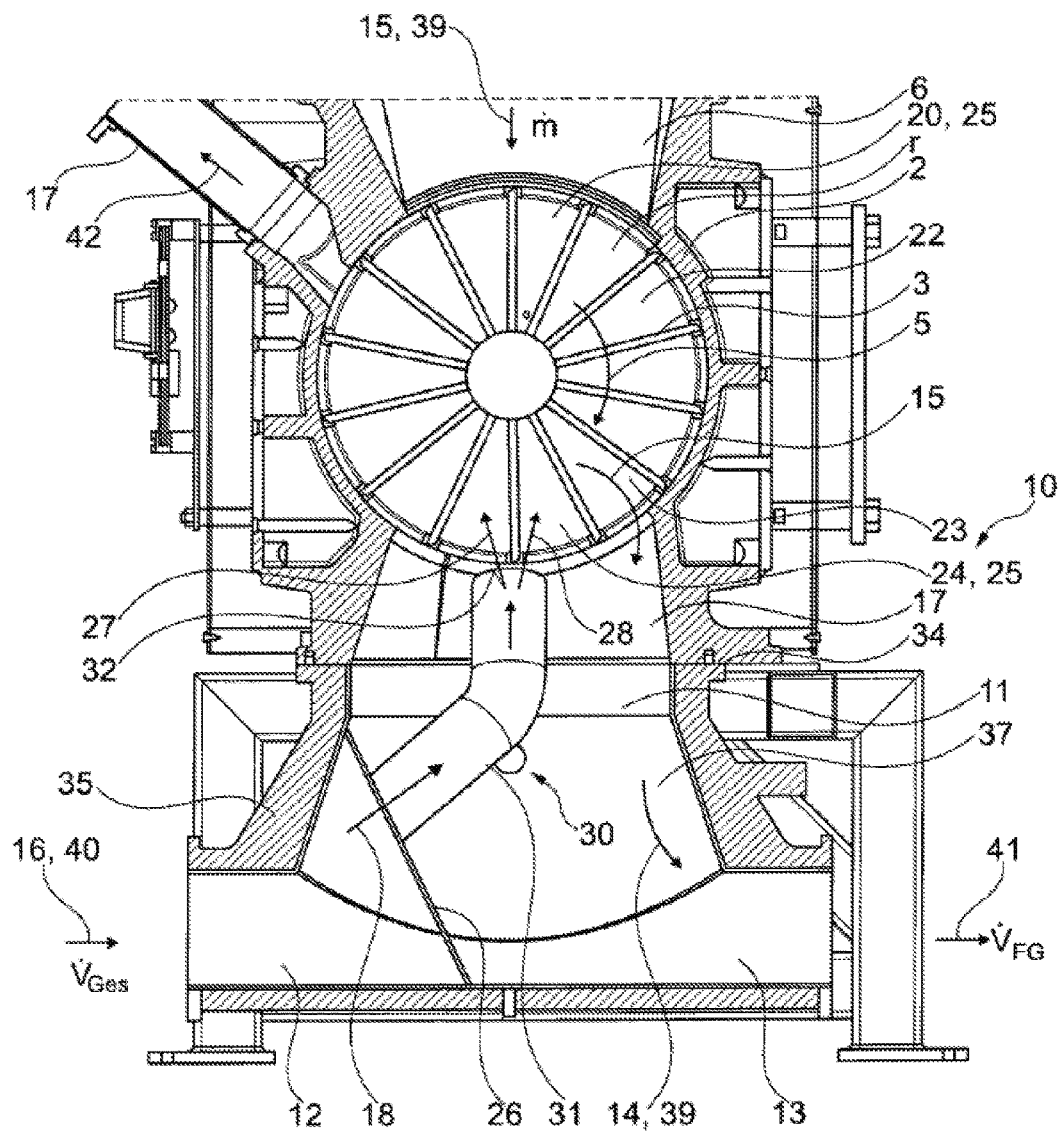
FIG. 1: shows a first exemplary embodiment of the invention having a rotary airlock and a blowing device according to the invention in a feeding shoe.

According to FIG. 1, with use of the same reference signs as in FIG. 12, it is provided that in the gas supply 12, which at the same time represents the conveyor line 13, a total gas quantity 40 is injected in the arrow direction 16, but no longer arrives directly in the outlet-side conveyor line 13. For this purpose, the most complete possible shut-off is performed in the gas supply 12 using a terminating plate 26, by which only the inlet side of a blowing device 30 is arranged in a gas-conducting manner, which consists in the present case of two parallel blowing tubes 31, 31a arranged in adjacent to one another.

The total gas quantity 40 in the arrow direction 18 is therefore now introduced with high efficiency, i.e., large volume and high pressure, into the blowing device 30, and the orifice 32, 32a of the blowing tubes 31, 31a is preferably oriented approximately radially on the outlet side in relation to the incoming airlock chambers 24.

Proceeding from the product supply 6, the product mass stream 39 in the arrow direction 15 will fill up in sequence the individual successive airlock chambers 20, 21, 22, 23, 24, which therefore move in the rotational direction 5 in the direction toward the outlet. A flange 34, on which the feeding shoe 10 is flanged in a gas-tight manner, is arranged on the lower side of the housing 3 of the rotary airlock 1. The blowing device 30, which is oriented with its one or more blowing tubes 31 toward the airlock chambers 23, 24 rotating past on the outlet side, protrudes through the feeding shoe 10. A flushing gas stream 33 is therefore produced in the arrow directions 27, 28, which is oriented directly into the outlet-side airlock chambers 23, 24. The product outlet 7 of the housing 2 of the rotary airlock 1 overlaps three airlock chambers here, for example, which are accordingly removed in sequence in the product outlet 7 and at the same time flushed by the blowing device 30.

The feeding shoe 10 essentially consists of a housing 35, which stands with supporting feet on a support surface, and the housing is flanged in a gas-tight manner on the housing 2 of the rotary airlock 1 at the flange 34.

The product mass stream 39 therefore flows in the arrow direction 14 downward through the collecting chamber 37 and thus leaves the feeding shoe 10, wherein the product is conveyed further by the conveyance gas quantity 41 $V_{FG}$.

The component of the injected total gas quantity 40 will flow along as leaked gas through the housing of the rotary airlock 1 and be supplied to the leaked gas nozzle 17, where a specific component of the total quantity 40 leaves the nozzle as the leaked gas quantity 42 $V_{LG}$.

The upper end of the feeding shoe 10 is moreover formed by a tube nozzle 11, which is part of the collecting chamber 37 and is terminated by the upper flange 34.

It is also recognizable in FIG. 1 that airlock chambers run past and are filled at the product supply 6 with a product filling 25, where this product is then let out at the outlet side in the region of the product outlet 7.

Figure 2:
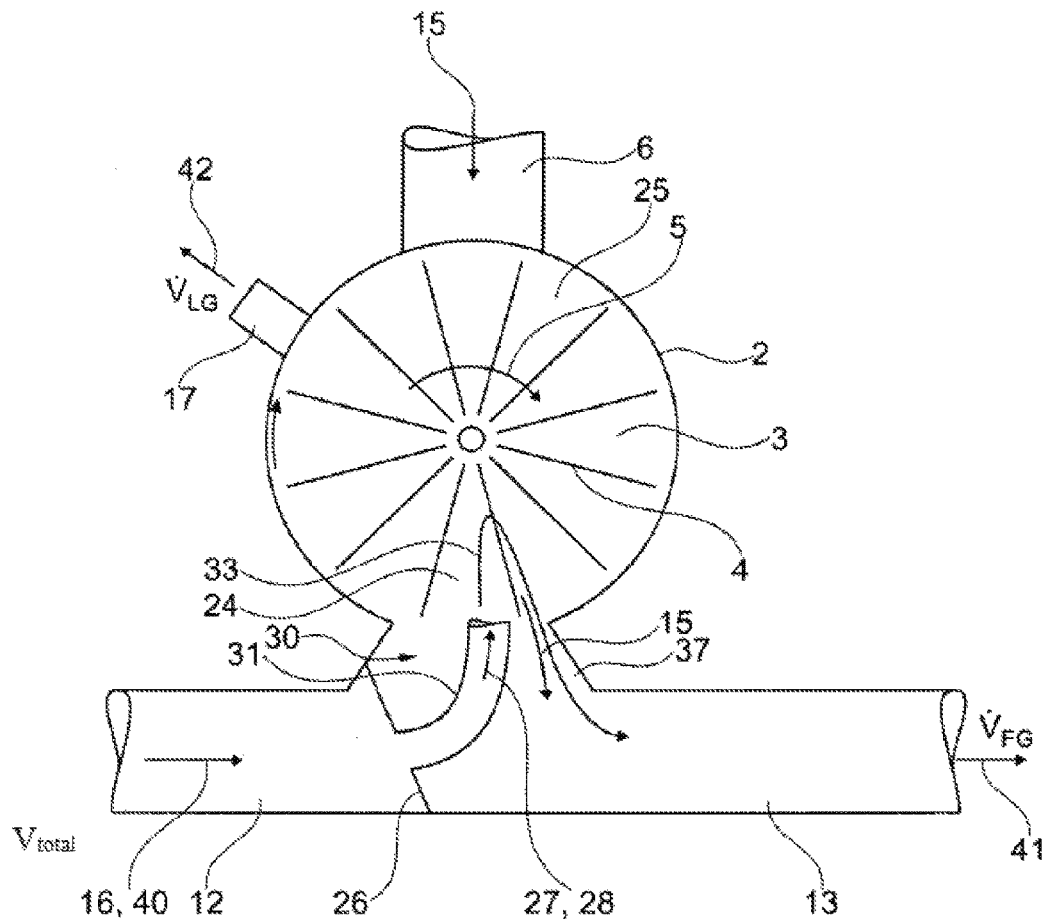
FIG. 2: schematically shows the example according to FIG. 1 with illustration of further details.

On the basis of FIG. 2, the essential advantages of the invention in relation to the prior art according to FIG. 12 will now be explained. It is recognizable that the total quantity, i.e., the total gas quantity 40 is supplied in the arrow direction 16 to the blowing device 30, because in this region the conveyor line 13 is terminated by the terminating plate 26 and a gas-conducting connection only still exists to the blowing device 30 arranged in the terminating plate 26. The total gas quantity 40 can therefore be provided for the blowing device 30. This is novel and unique over the prior art. Therefore—according to the illustration in FIG. 2—a flushing gas stream 33, which flushes the respective outlet-side airlock chamber 24 as the reversal stream, can penetrate particularly effectively into the airlock chamber 24 and free it of material accumulated therein without residue.

Due to this reversal effect, a targeted flow also occurs in the airlock chamber, which ensures a particularly good lifting effect of the materials accumulated therein on the airlock webs.

The invention is not restricted to a complete gas termination using a terminating plate 26. In other cases, it can be provided that a bypass is present in the terminating plate 26, which ensures that only the larger part of the total gas quantity 40 is supplied to the blowing device 30, while a smaller part is guided further in the conveyor line 13.

The invention is accordingly not restricted to a completely gas-tight termination of the gas supply 12 of the feeding shoe 10, because the terminating plate 26 can still have bypass gas openings.

Figure 3:
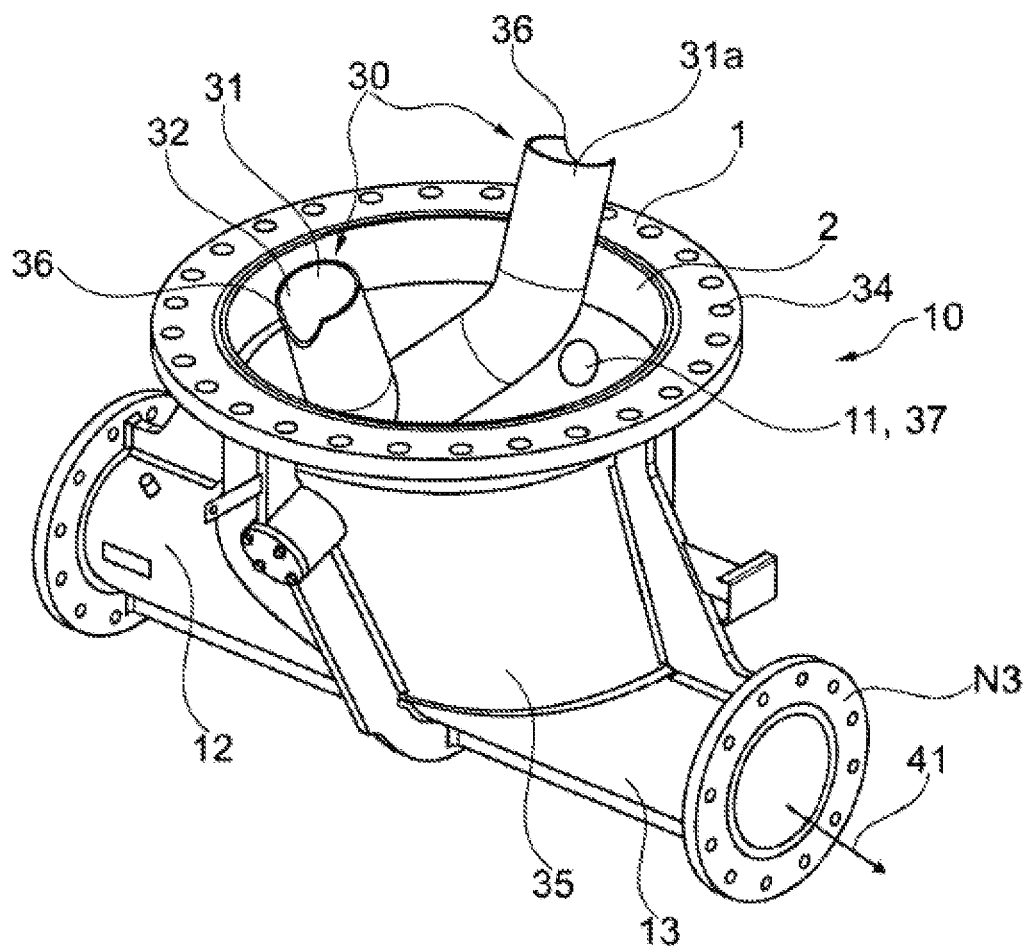
FIG. 3: shows a perspective illustration of the feeding shoe having a blowing device installed therein.

FIG. 3 shows the perspective illustration of the feeding shoe 10, in which the same parts are provided with the same reference numerals. It is recognizable that the blowing device 30 consists of two blowing tubes 31, 31a, which are arranged at a distance from one another and whose blowing orifices 32, 32a are arranged oriented in opposite directions, and therefore also produce flushing gas streams 33, 33a oriented in opposite directions.

Figure 4:
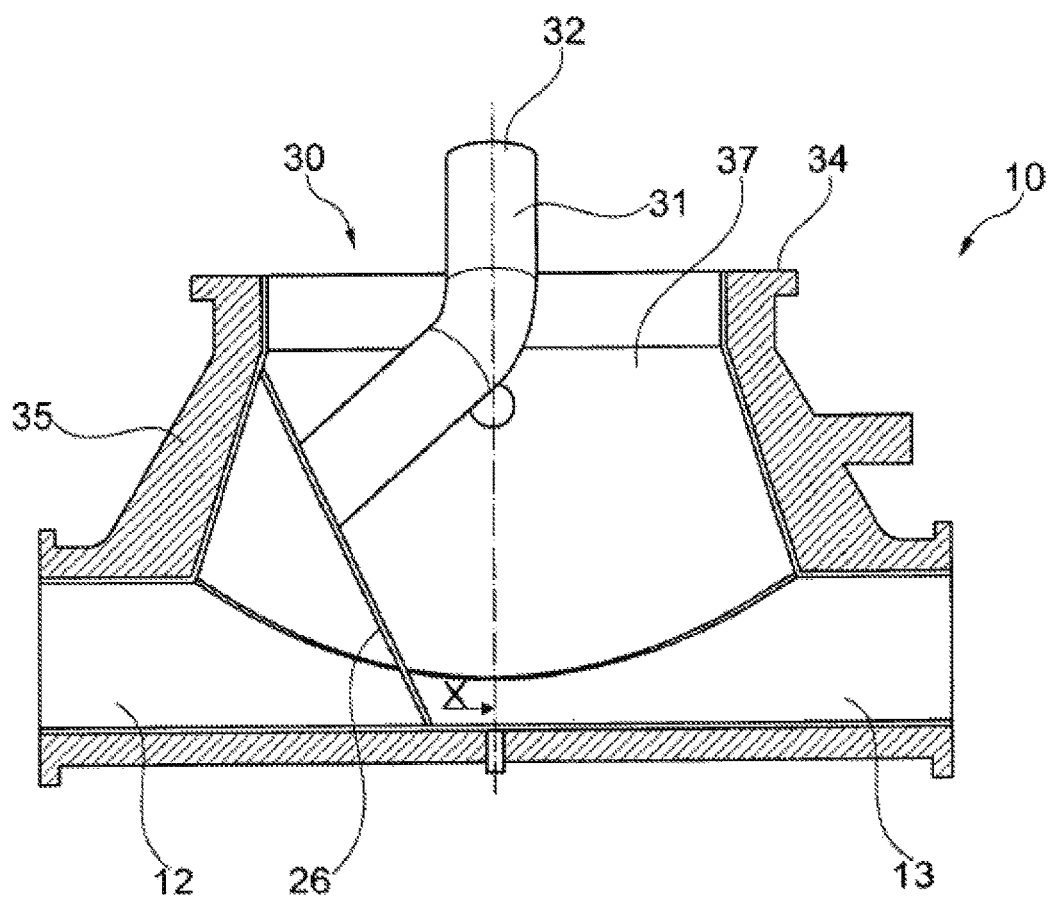
FIG. 4: shows a section through the feeding shoe according to FIG. 3.

FIG. 4 shows an enlarged illustration of the sectional illustration in FIG. 1, where it is recognizable how the feeding shoe 10 is formed in section. In the exemplary embodiment shown, the terminating plate 26 forms a complete gas termination in the direction toward the inlet-side gas supply 12 of the total gas quantity 40, and the gas is supplied exclusively to the blowing device 30.

Figure 5:
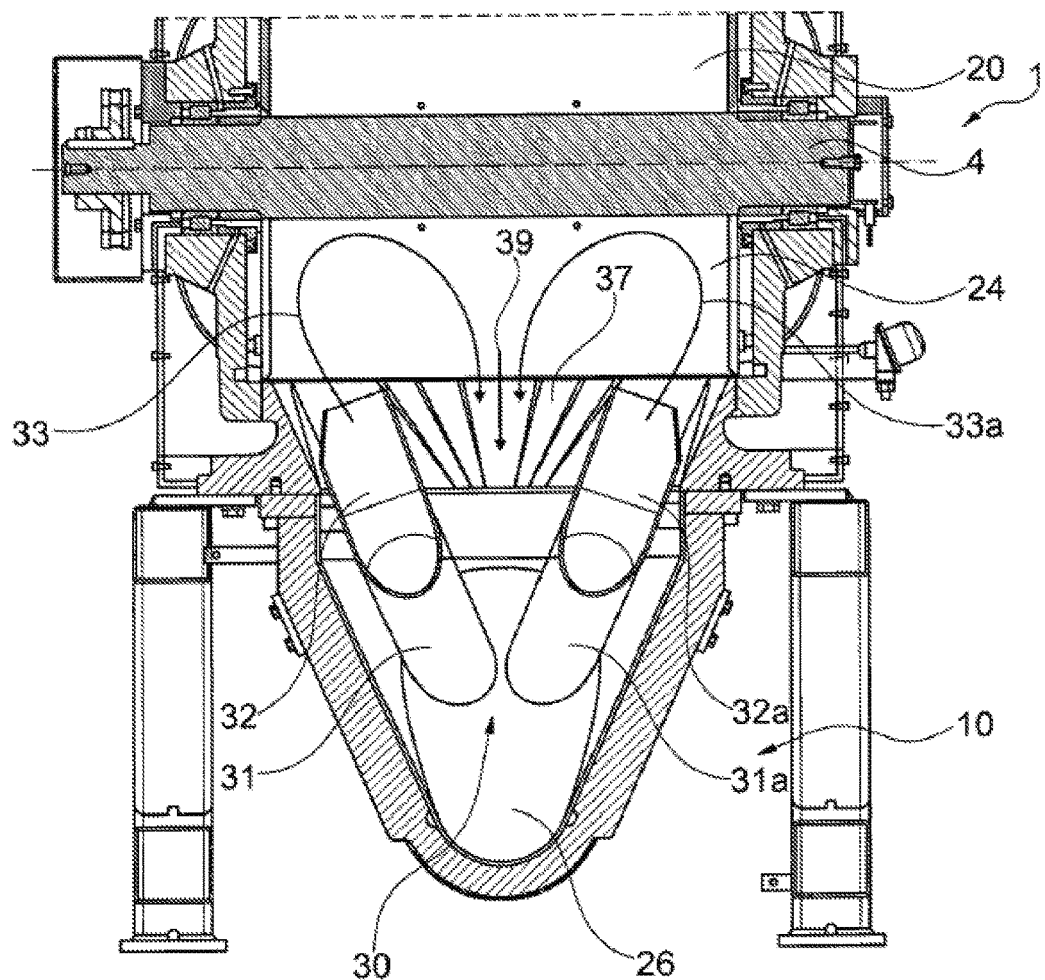
FIG. 5: shows a vertical section through the illustration according to FIG. 1.

FIG. 5 shows a refinement of the embodiment according to FIGS. 3 and 4, in which the two blowing tubes 31, 31a—oriented in different directions—also produce flushing gas streams 33, 33a, which extend essentially over the entire axial length of the respective airlock chamber 24 to be flushed, and which each flow oriented from the outside toward the inside, so that in the middle region of the airlock chamber 24 to be flushed, the two flushing gas streams 33, 33a are unified, and therefore entrain the product mass stream 39 in the middle and convey it in the direction toward the collecting chamber 37.

Figure 6:
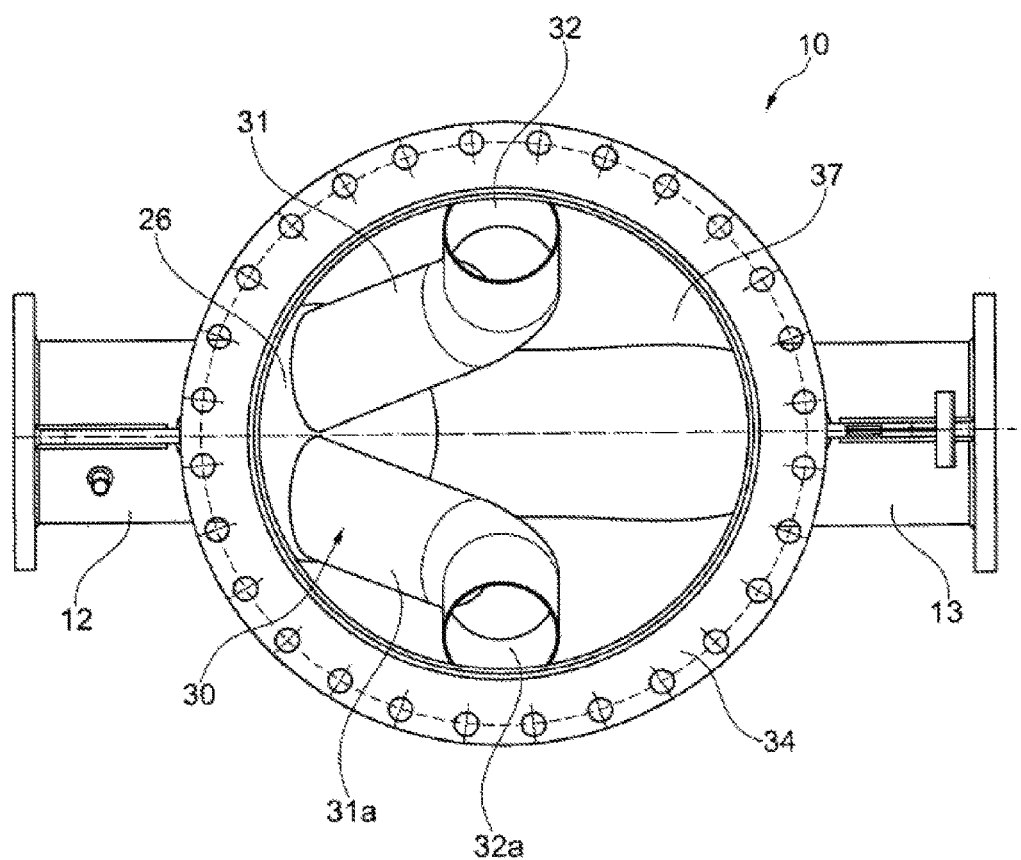
FIG. 6: shows a top view of the feeding shoe according to FIG. 3.

FIG. 6 shows the top view in an identical illustration as FIG. 5, where the same parts are provided with the same reference signs.

Figures 7, 8:
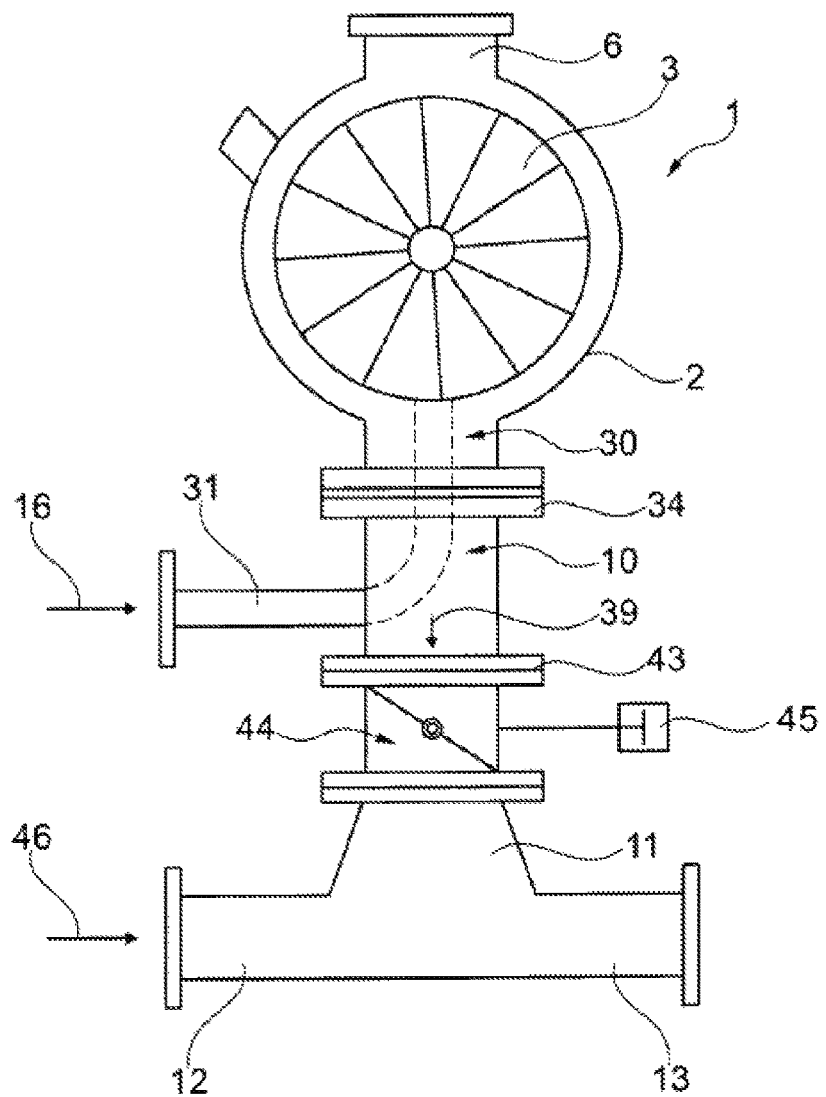
FIG. 7: schematically shows a second embodiment of a rotary airlock, which is installed as a series part in a number of rotary airlocks arranged in succession.
FIG. 8: shows the summation formulas for the gas streams in a first case and a second case.

FIG. 7 shows a second embodiment of a rotary airlock 1, which is intended for series operation of multiple rotary airlocks 1, which are arranged in parallel adjacent to one another and are arranged at a mutual distance from one another. Each rotary airlock 1 is connected for this purpose in the case of series operation (see FIG. 10) to a silo (not shown in greater detail), so that different product mass streams can each be fed via a rotary airlock 1 into a shared conveyor line 13.

FIG. 7 specifically shows that in the refinement of the invention, a shutoff device 44, which is controllable by a motor 45, is now arranged downstream of the feeding shoe 10 and the blowing device 30. This shutoff device 44 is arranged upstream of the tube nozzle 11 of the conveyor line 13, so that depending on the position of the shutoff device 44, the product mass stream 39 can be conveyed to the conveyor line 13 or also not.

FIG. 8 shows for this purpose the case 1 which was described in the exemplary embodiment according to FIGS. 1 to 6, from which it results that the total gas quantity 40 is composed of the conveyance gas quantity 41 and the leaked gas quantity 42. As a result, the blowing device 30 is supplied with the total gas quantity 40.

In the case of a series operation, as is indicated as the case 2 in FIG. 8 in the summation formula, only the first rotary airlock located in the series has the same summation formula applied as in case 1 of the blowing device, while in the downstream second rotary airlock, the blowing device is only still supplied with leaked gas quantity 42 of the second rotary airlock.

FIG. 9 accordingly shows the exemplary embodiment according to FIGS. 1 to 6 with the associated summation formula, which is also indicated as the case 1 in FIG. 8, while FIG. 10 shows the above-described series operation, which corresponds to the case 2 in FIG. 8. The gas streams indicated therein are also entered by arrows and corresponding indices.

The summation formula according to FIG. 11 accordingly shows that the total gas quantity of the system is composed of the delivery gas quantity $V_{FG}$ at the first rotary airlock plus the leaked gas quantities of the downstream further rotary airlocks, which are each in operation and the shutoff devices 44 of which are each open.

The invention therefore shows that a series operation of multiple rotary airlocks 1, 1a is also possible with high efficiency, and the blowing device 30 arranged therein in the feeding shoe 10 therein is always supplied with the maximum possible gas quantity, without requiring a bypass gas quantity for flushing the airlock chambers 24.

LIST OF REFERENCE SIGNS 1 rotary airlock
2 housing
3 airlock
4 axis of rotation
5 rotational direction
6 product supply
7 product outlet
8 flange
9
10 feeding shoe
11 tube nozzle
12 gas supply
13 conveyor line
14 arrow direction
15 arrow direction
16 arrow direction
17 leaked gas nozzle
18 arrow direction
19 arrow direction
20 airlock chamber
21 airlock chamber
22 airlock chamber
23 airlock chamber
24 airlock chamber
25 product filling
26 terminating plate
27 arrow direction
28 arrow direction
29
30 blowing device
31 blowing tube 31a
32 orifice (of 31) 32a
33 flushing gas stream 33a
34 flange
35 housing
36 contour (of 32)
37 collecting chamber
38
39 m=product mass stream
40 $V_{total}$=total gas quantity
41 $V_{FG}$=conveyance gas quantity
42 $V_{LG}$=leaked gas quantity
43 flange
44 shutoff device
45 motor
46 arrow direction

The invention claimed is:

1. A blowing device for a rotary airlock (1) comprising two flushing gas streams (33, 33a), which originate from a gas supply (12), for flushing and blowing out adhering material from at least one airlock chamber (20-24) when it is located closest to a product outlet (7) of the rotary airlock (1), wherein the blowing device (30) comprises at least two blowing tubes (32, 32a) to orient the flushing gas streams (33, 33a) onto at least one airlock chamber (20-24) of the rotary airlock (1), wherein a feeding shoe (10) is arranged at the product outlet (7), in which the blowing device (30) is arranged, and the gas supply (12) of the blowing device (30) is supplied by a conveying gas stream applied at an inlet to the blowing device (30), wherein the flushing gas streams (33, 33a) are oriented toward one another and produce a discharge flow oriented toward the product outlet in the airlock chamber (20-24).

2. The blowing device according to claim 1, wherein the gas supply of the blowing device (30) is supplied by a total gas quantity (40) applied at the inlet to the blowing device (30).

3. The blowing device according to claim 1, wherein the feeding shoe (10) has a terminating plate (26) as a shutoff between the gas supply (12) and the product outlet (7), at which an inlet side of the blowing device (3) is situated in a gas-conducting manner.

4. The blowing device according to claim 1, wherein the contour of an orifice (32) of the blowing tube (31, 31*a*) is formed profiled and/or constricted in relation to the tube cross section of the blowing tubes (31, 31*a*).

5. The blowing device according to claim 1, wherein the flushing gas streams (33, 33*a*), after flushing the airlock chamber (20-24), leave the airlock chamber (20-24) in a direction opposite to an injection direction.

6. The blowing device according to claim 1, wherein a number of rotary airlocks (1) are arranged serially in succession and operate on a shared conveyor line (13), wherein a blowing device (30) is associated with each of the rotary airlocks (1) arranged therein.

7. A blowing device for a rotary airlock (1) comprising at least two flushing gas streams (33, 33*a*), which originate from a gas supply (12), for flushing and blowing out adhering material from at least one airlock chamber (20-24) when it is located closest to a product outlet (7) of the rotary airlock (1), wherein the blowing device (30) comprises at least two blowing tubes (32, 32*a*) to orient the at least two flushing gas streams (33) onto at least one airlock chamber (20-24), wherein a feeding shoe (10) is arranged at the product outlet (7), in which the blowing device (30) is arranged, and the gas supply of the blowing device (30) is supplied by a conveying gas stream applied at an inlet to the blowing device (30), wherein injection points of the blowing device (30) into the airlock chamber (20-24) to be flushed are arranged divergently, and the produced at least two flushing gas streams (33, 33*a*) are unified again in a middle region of an airlock chamber (20-24) and a unified flushing gas stream flows out in the direction of a collecting chamber (37).

* * * * *